US006165308A

United States Patent [19]

Chen et al.

[11] Patent Number: 6,165,308

[45] Date of Patent: Dec. 26, 2000

[54] IN-PRESS PROCESS FOR COATING COMPOSITE SUBSTRATES

[75] Inventors: Frank Chen; Greg Muselman, both of Greensboro; Travis W. Idol, King; David H. Nowak, High Point, all of N.C.

[73] Assignee: Lilly Industries, Inc., Indianapolis, Ind.

[21] Appl. No.: 09/187,994

[22] Filed: Nov. 6, 1998

[51] Int. Cl.[7] .............................. B32D 31/20; B05D 3/12

[52] U.S. Cl. .......................... 156/289; 156/182; 156/230; 156/239; 156/241; 156/308.2; 427/370; 427/407.1

[58] Field of Search .................................... 156/230, 239, 156/232, 241, 289, 308.2, 182; 427/369, 370, 372.2, 385.5, 389.9, 391, 407.1

[56] References Cited

U.S. PATENT DOCUMENTS

| | | | |
|---|---|---|---|
| 3,164,511 | 1/1965 | Elmendorf | 161/57 |
| 3,940,230 | 2/1976 | Potter | 425/451.9 |
| 4,201,802 | 5/1980 | Vande Kieft . | |
| 4,241,133 | 12/1980 | Lund et al. | 428/326 |
| 4,517,228 | 5/1985 | Matejka et al. . | |
| 4,517,240 | 5/1985 | Tracton et al. . | |
| 4,940,741 | 7/1990 | De Wacker et al. . | |
| 5,059,264 | 10/1991 | Sheets . | |
| 5,616,419 | 4/1997 | Hsu et al. | 428/512 |
| 5,635,248 | 6/1997 | Hsu et al. | 427/358 |
| 5,674,934 | 10/1997 | Schmidt et al. | 524/555 |
| 5,719,239 | 2/1998 | Mirous et al. | 525/427 |
| 5,786,072 | 7/1998 | Hsu et al. . | |

FOREIGN PATENT DOCUMENTS

| | | |
|---|---|---|
| WO 96/22338 | 7/1996 | WIPO . |

*Primary Examiner*—Curtis Mayes
*Attorney, Agent, or Firm*—Barnes & Thornburg

[57] ABSTRACT

An improved process for manufacture of polymer coated composite substrates is described. a coated composite substrate is prepared in the press by applying a layer of a primer coating composition to the surface of a compressible mat comprising fibers and/or particles and a resin binder. The primer coating composition is formulated preferably as a fast setting polymer latex capable of forming a chemically crosslinked polymer matrix when applied to the surface of a compressible mat. A thermosetting top coat composition can be applied directly over the wet primer coating composition before heat-processing the mat to improve surface quality and release characteristics. Compressing and heating the coated mat produces a primed composite substrate directly out of the press.

38 Claims, No Drawings

IN-PRESS PROCESS FOR COATING COMPOSITE SUBSTRATES

FIELD OF THE INVENTION

This invention relates to the manufacture of composite construction materials. More particularly, this invention is directed to a cost efficient method for manufacture of coated compressed composite substrates wherein the coating is formed as a formaldehyde-free primer component of the composite substrate in a press. The in-press primed composite substrates manufactured in accordance with this invention have a hard, low porosity, smooth surface exhibiting excellent resistant to water and blocking and is ready without further treatment to receive final finish coating compositions.

BACKGROUND AND SUMMARY OF THE INVENTION

The demands of the construction industry for multifunctional, low cost construction materials has led to expanded use of composite substrates formed generally by compressing and heating a mat of particles and/or fibers combined with a resin binder and wax. While the most common fiber/particle components for such composites are cellulosic, such as wood particles, fibers, flakes or chips, there has also been significant research and development directed toward use of fibers/particles from other sources such as glass, synthetic polymers, carbon and inorganic fillers such as talc, alumina, silica, calcium carbonate and cementitious materials including fly ash and Portland cement. The most common composite substrates for use in construction today are those formed from particles, fibers, chips, flakes or other fragments of wood for the production of hardboard, medium density fiberboard, oriented strand board, particle board, plywood, and paper overlaid composites. Such composites are typically fabricated from a mixture of wood particles, fibers, flakes or chips with a binder, typically a thermosetting resin. The mixture is formed into a mat under wet-dry or dry process conditions and then compressed under heat and pressure into a dense composite substrate, typically in a sheet form. In some applications, such as in the manufacture of door skins, the mat is molded into a desired shape and/or provided with a smooth or textured surface during the thermal compression process. In related manufacturing processes paper is glued to the surface of the mat in the press. The manufacture of dense compressed composite substrates for use in the construction industry is well known in the art. See, for example, U.S. Pat. Nos. 3,164,511; 3,391,223; 3,940,230; and 4,241,133.

One important aspect of composite substrates destined for use in the construction industry is the quality and nature of the substrate surface. Many composite substrates are used in applications which require that the surface substrate be suitable for receiving finish coatings. Thus it is desirable that the substrate surface be hard, and substantially free from cracks, voids and porosity. Much effort has been directed to development of manufacturing techniques to obtain and assure high quality, ready-to-finish surfaces on composite substrates. Thus, for example, in the manufacture of finished door skins or exterior hardboard siding, a mat comprising wood pulp, resin binder and additives is compressed in a press between heated metal plates (platens) at a temperature of about 300° F. to about 490° F. at a pressure of about 500 to about 1500 psi for about 20 seconds to about 2 minutes. The resin binder is typically a thermosetting resin such urea/formaldehyde resins, phenol/formaldehyde resins, melamine/formaldehyde resins, acrylic resins, polyisocyanates or urethane resins. The mat is typically treated with a pre-press sealer to provide release from the hot press platen and thus optimize surface smoothness and minimize buildup on the press platens (metal plates). After the mat is pressed, typically to a predetermined stop thickness, the resulting board is further processed in a series of steps, including rehumidification, sizing, stacking, and transporting to a primer line for application of primer, and subsequent curing of the applied primer composition. With such current manufacturing techniques there is significant labor costs involved in transporting the composite board substrates from the press to the priming and curing stations. Further, there is significant capital and fuel costs associated with the required step of reheating and curing the primed composite boards.

Responsive to customer needs for reduced costs and improved quality of composite substrate construction materials, manufacturers of such materials have invested in significant research and development efforts to improve composite substrate manufacture. One goal of such efforts has been to develop a manufacturing process for composite substrates, particularly those formed from wood particulates and fibers, wherein the composite is formed with a primed/polymer coated surface in the press, thereby eliminating the subsequent steps of primer application and cure which are standard in current wood composite manufacturing operations. One such process is described in U.S. Pat. No. 5,635,748 wherein a polymer latex is applied as a foam on the surface of the mat, the foam is dried into a hardened layer which is thereafter crushed and set during pressing of the mat into a coated reconsolidated substrate. While that methodology is said to produce a primed composite board directly out of the press, the method requires an extra latex foaming step, and it requires an extra time/cost-consuming heating step similar to current manufacturing processes.

The present invention provides a cost efficient manufacturing process for manufacture of polymer coated (primed) composite substrates directly from the press without any extra latex processing or heating/drying steps. In accordance with one embodiment of this invention there is provided an improved process for manufacture of composite substrates having a high quality polymer coated surface directly out of the press. A fast-setting formaldehyde-free primer coating composition is applied to the surface of the compressible mat or to paper glued to the surface of the mat. The fast setting primer coating composition exhibits excellent "hold out" on the surface of the mat during subsequent mat compression between heated metal surfaces in a press. The primer coating composition is formulated to form a chemically crosslinked polymer matrix when or as it is applied to the surface. Pressing of the coated mat under standard conditions of elevated temperature and pressure produces a composite substrate having a smooth surface of low porosity, ideal for receipt of finish coating compositions. The present invention also enables the manufacture of coated paper wherein a fiber mat is coated and pressed into coated paper as part of the paper making process.

The primer coating composition comprises either a thermosetting polymer or a thermoplastic polymer and is otherwise formulated for rapid crosslinking/gel formation upon application to the surface of the mat. In one embodiment of the invention, the primer coating composition is formulated to undergo ionic crosslinking upon application to the compressible mat. In one preferred embodiment the primer coating composition comprises an anionically stabilized thermoplastic latex which undergoes a gel-forming pH dependent, ionic crosslinking reaction as it is applied to the surface of the mat. Alternatively, the primer composition can be a 2-component composition wherein the first and second components are capable of gel formation through ionic crosslinking when applied, for example, through a dual channel sprayer.

In another embodiment of the invention a top coat composition is applied over the applied primer coating composition before application of heat and pressure to the mat to form the polymer coated substrate. In one embodiment the top coat composition is a thermosetting latex composition which improves surface properties of the product polymer coated composition substrate and facilitates release of the composite from the heated metal surface, in the press. The top coat is preferably a formaldehyde free, low-temperature thermoset coating that functions both as a releasing agent and as an anti-metal-mark coating.

In yet another embodiment of the invention a release coat composition comprising a repaintable silicone polymer or a surfactant is applied over the primer coating composition to facilitate release of the polymer coated composite substrate from the press.

In still another embodiment of the invention the polymer coated composite substrate of this invention is prepared by a film transfer process. In that process, the primer coating composition is applied to a heated press platen, optionally over a first layer of a release agent and/or a thermosetting latex top coat composition, and the heated metal platen is thereafter contacted under pressure with the compressible mat optionally pretreated with an adhesive composition, to provide a compressed polymer coated composite substrate. The primer film transfer process can be employed with particular advantage in the manufacture of composite substrates in continuous belt-type presses.

DETAILED DESCRIPTION OF THE INVENTION

In accordance with this invention there is provided an improved process for the manufacture of polymer coated composite substrates, most typically those formed from a compressible mat comprising cellulosic fibers or particles, and/or wood chips or flakes. Such wood composite substrates are commonly used in a wide variety of building construction applications, many of which dictate that the composite substrates have smooth, hard, high quality surfaces suitable for receiving finished coating compositions. The present invention enables the cost efficient manufacture of such high quality composite substrates. It also provides methodology for efficient manufacture of coated papers wherein the composite substrate is a cellulosic fiber mat, generally much thinner than those used for hardboard manufacture, having optional wax, filler and binder components.

The compressible mat from which the substrate is formed is first coated with a rapid setting primer coating composition that allows production of a high quality polymer coated composite substrate directly from the press. The mat can optionally be covered with a paper sheet typically glued to the surface of the mat and thereafter coated with the rapid setting primer composition. In one embodiment, this invention includes the step of applying a quick set primer coating with excellent coating "hold out" to the compressible mat, optionally applying a thermosetting or thermoplastic top coat formulation over the quick set primer coating layer, and compressing the mat with the applied coating(s) between heated metal plates (platens) under standard conditions of heat and pressure to produce an improved polymer coated composite substrate of this invention. The metal plates can be flat and smooth (or embossed to provide a predetermined pattern in the surface of product composite sheets), or the plates can be in the form of complementary molds which work to compress the mat into a three-dimensional molded shape, such as those used in the manufacture or door skins. The polymer coating on the composite substrate so produced exhibits ideal physical characteristics such as low porosity, surface smoothness, surface hardness, and flexibility—a particularly important characteristic when the composite substrate is molded to a predetermined shape during mat compression. The composite substrate coating also exhibits favorable chemical properties, including excellent blocking resistance and resistance to moisture, and good adherence to applied finish coating compositions.

The primer coating composition used in accordance with the present invention typically comprises a water dispersible thermosetting or thermoplastic polymer. The composition is formulated to form a chemically crosslinked polymer matrix, for example, a 3-dimensional gel when, or as, it is applied to the surface of the compressible mat. Any of a wide variety of polymer latexes, either as single or two-component compositions, can be utilized provided that such are formulated to provide a fast set chemistry that enables rapid chemical crosslinking of the polymer as it is applied to the compressible mat.

The primer coating composition can be formulated so that the crosslink bonding can occur rapidly via ionic or covalent bonding as it is applied to the mat. Thus, in one embodiment of the invention the primer coating composition is formulated to form an ionically crosslinked polymer matrix when applied to the surface of the compressible mat. Such coating compositions are known in the art; however their unique application in the manufacture of polymer coated composite substrates, as described herein, is new and provides significant advantage in the manufacture of in-press polymer coated composite substrates. Exemplary of coating compositions formulated for fast setting via ionic crosslinking of polymer component are those described in PCT International Application No. PCT/US96/00802, published Jul. 25, 1996 as International Publication No. WO 96/22338, the disclosure of which is herein incorporated by reference. The aqueous coating composition described in that publication comprises from 95 to 99 weight percent, based on the weight of dry materials in the composition, of an anionically stabilized aqueous emulsion of a copolymer having a Tg from −10° C. to 50° C. The copolymer comprises in polymerized form a polymerization mixture containing two or more ethylenically unsaturated monomers, wherein, based on the total weight of all ethylenically unsaturated monomers in the polymerization mixture, from 0 to 5 weight percent of the monomers are alpha, beta-ethylenically unsaturated aliphatic carboxylic acid monomers; from 0.2 to 5 weight percent of a polyimine having a molecular weight of from 250 to 20,000; and from 0.2 to 5 weight percent of a volatile base; wherein the composition has a pH from about 10.3 to about 12, more typically about 8 to about 11, and wherein a cast film of the composition has a hardening rate measurement rating of at least 5 within 20 minutes after casting under ambient conditions of temperature up to 30° C. and relative humidity no less than 50%. The composition is optionally pigmented and is described as particularly useful as a fast hardening aqueous traffic paint.

The fast set latex composition can also be formulated to include standard coating excipients such as defoamers, wetting agents, dispersants, release agents, pigments and fillers, such as organic fillers, inorganic fillers, organic fibers, inorganic fibers or mixtures thereof. The composition is optionally pigmented and is described as particularly useful as a fast hardening aqueous traffic paint.

The volatile base component of the fast set latex includes an organic or inorganic compound which is a weak or strong, base or which has sufficiently high vapor pressure and tendency to evaporate or otherwise volatilize out of the aqueous coating composition, thereby engendering a reduction in pH and concomitant ionic crosslinking of the polyimine and carboxy polymer components of the composition. Examples of volatile bases include ammonium hydroxide and organic amines containing up to four carbon atoms, including, for example, dimethylamine, diethylamine, aminopropanol, ammonium hydroxide, and 2-amino-2-methyl-1-propanol with ammonium hydroxide being most preferred. The volatile base typically comprises about 0.3 to about 1.5 weight percent of the coating composition. One polymer coating composition utilizing such chemistry is commercially available from the Dow Chemical Company as a fast-set 50% solids latex sold under the name Dow DT 211 NA.

There are, of course, multiple other polymer compositions that can be formulated and applied to provide quick setting, ionic chemistry to provide a polymer gel matrix exhibiting the requisite high "hold out" property important for providing high quality in-press polymer coated polymer substrates in accordance with this invention. Thus, it is possible to prepare polymer backbones having both cationic and anionic moieties in the same polymer molecule with one of the ionic species modified by control of ambient pH. See, for example, the polymer systems described in U.S. Pat. No. 5,674,934, specifically incorporated herein by reference. The polymer system is designed so that upon application of the coating, an application-dependent pH change, for example that effected by loss of carbon dioxide, reionizes the neutralized ionic species to provide an ionically crosslinked system through the pendent anionic and cationic groups resulting in rapid formation of an ionically crosslinked polymer matrix or gel.

Alternatively, an ionically crosslinked polymer gel matrix can be formed on the surface of a compressible mat in performance of the method of this invention by applying an anionic latex system co-sprayed, for example, using a dual channel spraying gun, with a cationic polyamine or polyimine or a cationic latex system to form a 3-dimensional ionically crosslinked polymer gel matrix upon application to the surface of the mat. Alternatively, an anionic latex system can be co-sprayed with a water soluble salt containing di- or multi-valent cationic species, for example, zinc or calcium salts, to effect ionic crosslinking and gel formation upon application to a compressible mat in performance of the method of this invention. The fast set latex can be substantially thermoplastic, or it can include other functional groups recognized by those skilled in the art to impart thermosetting functionality to the polymer latex.

In another embodiment of the present invention the primer coating composition is formulated to provide a quick setting covalently crosslinked polymer matrix on the surface of the compressible mat. The formation of such covalently crosslinked polymer compositions on the surface of the compressible mat prior to formation of the coated composite substrates is preferably achieved using two component systems that when combined provide a level of covalent crosslinking reactivity sufficient to allow at least partial covalent crosslinking of the applied polymer formulation prior to compressing the coated mat between heated plates in a press. Thus, for example, conventional two component epoxy, urethane or ethylenically unsaturated polymers/oligomers/monomers (where a radical initiator is co-applied with the radical crosslinkable composition) can be utilized in forming a crosslinked polymer matrix on the surface of the mat. The two component systems can be applied to the mat, for example, as separate components through a dual channel spray gun, or they can be blended together immediately prior to application to the mat and applied as a reactive homogeneous polymer composition. The nature of the reactive components of the two component compositions is not critical, and such reactive polymer composition can be optimized by routine experimentation to provide a level or reactivity sufficient to provide at least partial covalent crosslinking of the formulation on the surface of the mat prior to compressing the mat under heat and pressure to form the present polymer coated composite substrates.

The amount of primer coating composition required for optimum manufacture of high quality polymer coated substrates directly from the press in accordance with this invention is dependent upon the nature of the primer coating composition components, the crosslinking chemistry, the solids content of the primer and the nature of the components of the compressible mat itself. In one embodiment the primer composition for use in hardboard manufacture can have a solids content of about 30 to about 80 percent by weight. In another embodiment a primer composition for coated paper manufacture has a solids content of about 20 to about 70 percent by weight. When the primer coating composition is formulated as a polymer latex utilizing pH dependent coacervation chemistry or ionic crosslinking chemistry for formation of the polymer matrix on the surface of a mat prepared for fiberboard, particle board, chip board, or door skin manufacture, the primer composition can be applied at a rate of about 7 g to about 40 g, more typically about 10 g to about 20 g per square foot of mat surface. The amount of primer composition can be adjusted within that range or it can be used at higher application rates if necessary to optimize quality of the polymer coating on the in-press coated composite substrate. Typically primer application rates are lower in paper coating operations, i.e., about 1 to about 10 grams per square foot.

The technology forming basis of this invention, i.e., the use of a rapid pre-setting, high "hold-out", thermoplastic or thermosetting coating composition optionally in combination with a wet-on-wet applied thermosetting top coating, cured to a finished surface coating during contact with a heated metal surface, can be used to form durable high quality coatings on a wide variety of porous and non-porous substrates, including not only compressible mats as described above, but as well precompressed composite substrates, paper coated substrates and other commercially important construction materials.

In one embodiment of the present invention the quality and functionality of the polymer coating in the in-press polymer coated composite substrates of this invention is improved by applying a layer of a polymer-containing top coat composition over the chemically crosslinked polymer matrix on the compressible mat before compressing the mat in the press. The top coat composition is preferably a thermosetting or thermoplastic polymer latex. In one preferred embodiment of the invention the top coat composition comprises a thermosetting polymer latex, for example, an acrylic latex formed from unsaturated monomers including hydroxy and/or glycidyl functionality and carboxy functionality. The top coat composition is applied at a rate generally less than that of the primer coat composition and typically less than one-half that of the primer, for example, about 0.5 to about 10 g, more typically about 3 to about 7 g, per square foot in composite board manufacture. The top coat latex composition typically comprises about 25 to about 60% solids and, like the primer coat composition, can be formulated using standard coating excipients including but not limited to defoamers, dispersants, wetting agents, pigments, release agents and fillers, such as silica, talc, kaolin, calcium carbonate and the like.

The thermosetting top coat composition not only functions to improve surface hardness and mar resistance to the coated composite substrates prepared in accordance with this invention, but it also functions to provide a thermoset "skin" over the primer coating composition to facilitate release of the coated composite substrates from the metal surfaces in the press.

In addition to, or as an alternative to, the step of applying a thermosetting top coat composition over the chemically crosslinked primer coating polymer matrix, a separate release composition can be applied to facilitate release of the coated composite substrates from the press. Release compositions are well known in the art and can be formulated to include recognized release agents alone or in combination to provide the desired release characteristics. In one embodiment of the invention a release coating composition comprising a thermoplastic or thermosetting silicone polymer or a surfactant is applied over the chemically crosslinked polymer matrix before pressing the matrix coated mat between the heated metal plates. In another embodiment of the invention a thermosetting top coat latex composition is applied over the crosslinked polymer matrix and a release coating composition is applied over the top coat composition before pressing the coated mat between the heated metal plates. The release composition, when utilized in the present process for manufacture of in-press coated composite substrates is typically applied at minimum usage levels sufficient to facilitate release of the coated composites from the press plates. Release compositions, when utilized in performance of the process of this invention are typically applied at less than 3 g per square foot, more preferably less than 1 g per square foot. Use excessive amounts of release agents can adversely affect finish coating adherence to the polymer surface of the coated composite substrates in accordance with this invention.

In accordance with one embodiment of this invention there is provided a process for manufacture of an in-press coated composite substrate comprising the steps of forming a wet coating composition laminate comprising (1) a layer of a primer coating composition comprising a water dispersible thermosetting or thermoplastic polymer, said primer coating layer being formed as a chemically crosslinked polymer matrix, and (2) a layer of a top coat composition including a thermoplastic or thermosetting polymer latex composition; contacting the primer coating layer with a surface of a compressible mat comprising fibers or particles and a resin binder composition; compressing the mat and the coating laminate between heated metal surfaces in a press; and releasing the compressed, polymer coated composite substrate from the press. That process can be carried out using any one of several alternate protocols. Thus, as described generally above, the wet coating composition laminate can be formed on the surface of the compressible mat by first applying a layer of the primer coating composition to the mat and applying a layer of the top coat composition over the primer coating composition layer before compressing the mat and the applied coating laminate in a press. The primer coating composition and the top coat composition can be applied to the mat using art recognized application techniques, including conventional airless or assisted airless spray, curtain coat, and direct roll coat. The top coat composition is typically applied immediately over the still wet primer coating composition on the mat surface, and the mat with the still wet coating composition laminate on its surface is compressed and/or molded in the press to form the presently polymer coated composite substrate. In one alternative embodiment, a release composition is applied, typically by spraying such over the top coat composition layer to facilitate release of the polymer coated substrate from the press.

In an alternate embodiment of the invention the coating laminate is prepared by applying its component layers to the heated metal surface of the press (in reverse order of their application to the mat), and the coating laminate is transferred to the mat, optionally having a paper overlay, as it is compressed with the laminate coated metal surface in the press. In such a primer film transfer process, the surface of the mat (or paper) to receive the coating laminate can be coated with an adhesive to promote adherence of the coating laminate to the compressed mat during the compression/heating step. Thus using a film transfer process protocol the coating laminate is prepared by applying to the heated press platen, in sequence, a layer of a release coat composition, a layer of a top coat composition, and a layer of a primer coat composition. Optionally, an adhesive layer can be applied to the primer coat layer on the heated platen to optimize adherence of the transferred film laminate to the composite substrate of this invention.

In one embodiment of the invention a primer transfer method is utilized to produce a primed door skin. A light film of a water-based release agent is applied to the hot {300° F.) caul plate. It dries instantly. The primer is then spray-applied (9 wet g/sq. foot—equivalent to 1.0 dry mil) at 60% solids by weight (40% by volume) directly to the hot caul plate. The primer composition dries almost instantly. The fiber mat is brought into direct contact with the dry primer on the caul. The mat is pressed to ⅛" stops at 90 seconds at 300° F. Transfer of the primer to the caul plate to the door skin takes place under a variety of press cycles. The press is open to release primmed door skin that looks very much like door skins produced in the conventional manner. One advantage of applying the release agent and primer to the caul plate is that the amount of applied primer is essentially the same as that applied in normal priming operations. In fact, it has been found that using the primer transfer method the polymer coated composite substrates (door skins) having surface properties similar to that attainable using normal out-of-press priming applications can be achieved using but 90% of the amount of primer composition.

While the above-mentioned primer transfer method can be utilized in standard piecework hard board manufacturing operations, the primer transfer method has particular application in continuous press (Conti-press) manufacturing processes for hardboard/fiberboard manufacture. In the continuous press method, the press consists of a continuous heated steel belt that is brought into contact and ultimately compressively contact with the mat through a series of rollers behind the belt so that as the mat moves continuously through the process the belt and roller apply heat and increasing pressure to the mat. At the end of the continuous press, a solid formed hardboard or fiberboard is produced having physical characteristics much like normal hardboard. The primer transfer method is uniquely adapted for application to continuous press manufacturing processes for composite substrate manufacture. The coating laminate can be formed on the continuous belt by applying the release coating, the top coating and/or the primer coat sequentially to the heated steel belt by any means, but most practically by direct roll coaters before the belt comes into contact with the mat so that there is little or no waste as would typically be incurred in spray applications.

EXAMPLE 1

A wood fiber mat or a reconsolidated wood fiber mat for making door skin was coated with the fast-set primer formulation described below (at about 15 gms/sq. ft.) Followed by the anti-metal-mark top coat formulation (at about 3 gms/sq. ft.). The coated mat was then placed in a press at a temperature of about 250° F. to about 490° F. for about 20 seconds to about 120 seconds at a pressure of approximately 900 psi. The press can be either flat or dieform with deep draw feature. After the pressing, an in-mold primed/anti-metal-mark top coated door skin was released from the press. The aesthetic features of this in-mold primed door skin is very much comparable to that of a conventional door skin which is primed in a finishing line after the press line.

| Ingredient | Weight % |
|---|---|
| PRIMER FORMULATION | |
| Fast-Set Latex (Dow DT 211 NA; 50% Total Solids | 41.73 |
| Drew L475 (Ashland Chemical/defoamer) | 0.25 |
| Acrysol I-62 (Rohm & Haas/dispersant) | 0.64 |
| Surfynol TG (Air Products/wetting agent) | 0.51 |
| Deionized Water | 3.94 |
| Riona RCL9 (SCM $TiO_2$/pigment) | 14.71 |
| Gamaco II (Dry Branch Kaolin/filler) | 35.12 |
| Neogen DGH (Dry Branch Kaolin/filler) | 3.10 |
| ANTI-METAL-MARK TOP COAT FORMULATION | |
| Low temperature, HCHO-free Thermoset Latex (40% Total Solids; 26 parts Styrene/30 parts methylmethacrylate/30 parts butyl acrylate/10 parts glycidal methacrylate/4 parts methacrylic acid) | 75.00 |
| Syloid Z128 (W. R. Grace) silica/gloss control | 6.00 |
| Acrysol I-62 (Rohm & Haas) | 1.00 |
| Surfynol TG (Air Products) | 0.30 |
| Deionized Water | 17.45 |
| Drew L475 (Ashland Chemical) | 0.25 |

EXAMPLE 2

A wood fiber mat or a reconsolidated wood fiber mat for making door skin is coated with a polymeric adhesive before moving into the press. The heated top plate of the press as described in Example 1 is spray coated first with a releasing agent followed by the anti-metal-mark coating and then the primer coating. During the press cycle, the laminated coating film was released from the top plate and glued onto the mat. An in-mold primed and anti-metal-mark top coated door skin having excellent surface properties is released from the mold.

EXAMPLE 3

A continuous wood fiber mat or reconsolidated wood fiber mat for making door skin or particle board is spray coated with primer coating formulation (15/sq. ft.) followed by the anti-metal-mark top coat (5 g/sq. ft.). The primed mat is passed through a heated Conti-press to yield a line of "in-press" primed door skin which then can be cut in pieces for shipment. This in-press primed board can also be made through the film transfer process as described in Example 2 above in a Conti-press line.

What is claimed:

1. A process for manufacture of an in-press coated composite substrate, said process comprising the steps of
   forming a coating composition laminate comprising
   1) a layer of a primer coating composition comprising a water dispersible thermosetting or thermoplastic polymer, said primer coating layer being formed as a chemically crosslinked polymer matrix, and
   2) a layer of a top coat composition including a thermoplastic or thermosetting polymer latex composition;

contacting the primer coating layer with a surface of a compressible mat comprising fibers or particles and a resin binder composition;
   compressing the mat and the coating laminate between heated metal surfaces in a press; and
   releasing the compressed, polymer coated composite substrate from the press.

2. The process of claim 1 wherein the fibers or particles used to form the mat are selected from cellulose, glass, synthetic polymers and carbon.

3. The process of claim 2 wherein the mat further comprises an inorganic cementitious composition.

4. The process of claim 1 wherein the coating laminate is formed by applying a layer of the primer coat composition to the surface of the mat and applying a layer of the top coat composition over the primer coat layer before compressing the mat.

5. The process of claim 4 wherein the top coat composition comprises a thermosetting polymer and the coating laminate further comprises a layer of a release composition in contact with the top coat layer, said release composition comprising a silicone polymer or a surfactant.

6. The process of claim 1 wherein the top coat composition comprises a thermosetting polymer and the coating laminate further comprises a layer of a release composition in contact with the top coat layer, said release composition comprising a silicone polymer or a surfactant.

7. The process of claim 6 wherein the coating laminate is prepared by applying, in sequence, a layer of a release coat composition, a layer of a top coat composition and a layer of a primer coat composition to a heated metal surface of the press, and the mat is compressed between the laminate coated metal surface and a second metal surface in a press.

8. The method of claim 7 wherein the heated metal surface is a continuous belt.

9. The method of claim 7 wherein an adhesive is applied to the surface of the mat or the primer coat layer before the mat is compressed between the laminate-coated metal surface and the second metal surface in the press.

10. The process of claim 1 wherein the compressible mat further comprises a paper sheet forming the surface of the mat in contact with the primer coating layer.

11. A process for manufacture of an in-press polymer coated composite substrate, said process comprising the steps of
   applying a layer of a primer coating composition to the surface of a compressible mat comprising fibers or particles and a resin binder, said primer coating composition comprising a thermosetting polymer or a thermoplastic polymer and formulated to form a chemically crosslinked polymer matrix when applied to the surface of the compressible mat and before heating the mat;
   compressing the mat and the chemically-crosslinked polymer matrix between heated metal surfaces in a press to form the polymer coated composite substrate; and releasing the polymer coated composite substrate from the press.

12. The process of claim 11 wherein the polymer matrix on the surface of the compressible mat comprises an ionically crosslinked polymer.

13. The process of claim 12 wherein the ionically crosslinked polymer comprises a thermoplastic polymer.

14. The process of claim 11 wherein the polymer matrix on the surface of the compressible mat comprises a covalently crosslinked polymer.

15. The process of claim 11 further comprising the step of applying a layer of a polymer-containing top coat composition over the chemically crosslinked polymer matrix on the compressible mat before compressing the mat in the press.

16. The process of claim 15 wherein the top coat composition comprises a thermosetting polymer latex.

17. The process of claim 11 further comprising the step of applying a release coat composition comprising a silicone polymer or a surfactant over the chemically crosslinked polymer matrix on the compressible mat before compressing the mat in the press.

18. The process of claim 11 wherein the compressible mat further comprises a paper sheet forming the surface of the mat to which the layer of primer coating is applied.

19. The process of claim 11 wherein the composite substrate is paper.

20. In a process for manufacture of a polymer coated composite substrate including the step of pressing a compressible mat comprising fibers or particles and a resin binder between heated metal plates in a press to form a compressed composite substrate, the improvement comprising the steps of applying a polymer-containing primer composition to the surface of the compressible mat before pressing it between the heated metal plates, said polymer-containing primer composition being formulated to provide an ionically crosslinked polymer matrix as it is applied on the surface of the compressible mat; and thereafter pressing the matrix coated mat between heated metal plates to form a polymer coated composite substrate.

21. The improvement of claim 20 wherein the polymer-containing primer composition comprises an anionically stabilized thermoplastic latex.

22. The improvement of claim 20 wherein the primer composition comprises a thermoplastic polymer latex.

23. The improvement of claim 20 wherein the primer composition comprises a thermosetting polymer latex.

24. The improvement of claim 20 further comprising the step of applying a layer of thermosetting top coat latex composition over the crosslinked polymer matrix before pressing the matrix coated mat between the heated metal plates.

25. The improvement of claim 24 further comprising the step of applying a release coating composition comprising a silicone polymer or surfactant over the top coat composition before pressing the matrix coated mat between the heated metal plates.

26. The improvement of claim 20 wherein the compressible mat further comprises a paper sheet forming the surface of the mat to which the primer composition is applied.

27. The process of claim 20 wherein the composite substrate is paper.

28. A process for the manufacture of a coated porous substrate comprising applying a polymer-containing primer composition to the surface of a porous substrate, said primer composition being formulated to provide an ionically crosslinked polymer matrix as it is applied on the surface; and contacting the matrix coated substrate with a heated metal plate.

29. The process of claim 28 wherein the primer composition comprises a anionically stabilized thermoplastic latex.

30. The process of claim 28 wherein the primer composition comprises a thermosetting latex.

31. The process of claim 28 further comprising the step of applying a layer of a thermosetting latex top coat composition over the crosslinked polymer matrix before the surface is contacted with the heated metal plate.

32. The process of claim 28 wherein the coated porous substrate is paper.

33. A process for manufacture of an in-press coated composite substrate, said process comprising the steps of selecting or forming a film comprising a formaldehyde-free chemically crosslinked polymer matrix for transfer to a compressible mat comprising fibers or particles and a resin binder composition;

contacting the film in with a surface of the compressible mat;

compressing the mat and film between heated surfaces in a press; and releasing the compressed, polymer coated composite substrate from the press.

34. The process of claim 33 wherein an adhesive is applied between the film and the surface of the compressible mat.

35. The process of claim 33 wherein the film comprises a top coat and a primer coat layer.

36. A process for manufacture of an in-press polymer coated composite substrate, said process comprising the steps of applying a primer coating composition to the surface of a compressible mat, or to paper which is glued to the surface of the mat, said primer coating composition comprising a polymer formulated to form, without heating, a chemically crosslinked polymer matrix when applied to the mat or paper surface, and compressing the mat and the crosslinked polymer matrix primer coating while heating the mat.

37. The process of claim 36 wherein the primer coating composition is formulated to form an ionically crosslinked polymer matrix as it is applied to the mat or paper surface.

38. The process of claim 36 wherein the primer coating composition is formulated to form a covalently crosslinked polymer matrix as it is applied to the mat or paper surface.

* * * * *